June 6, 1961
J. B. HARVEY
2,987,135
VEHICLE STEERING SYSTEM WITH AUTOMATIC CORRECTING MEANS
Filed Dec. 23, 1958
2 Sheets-Sheet 2
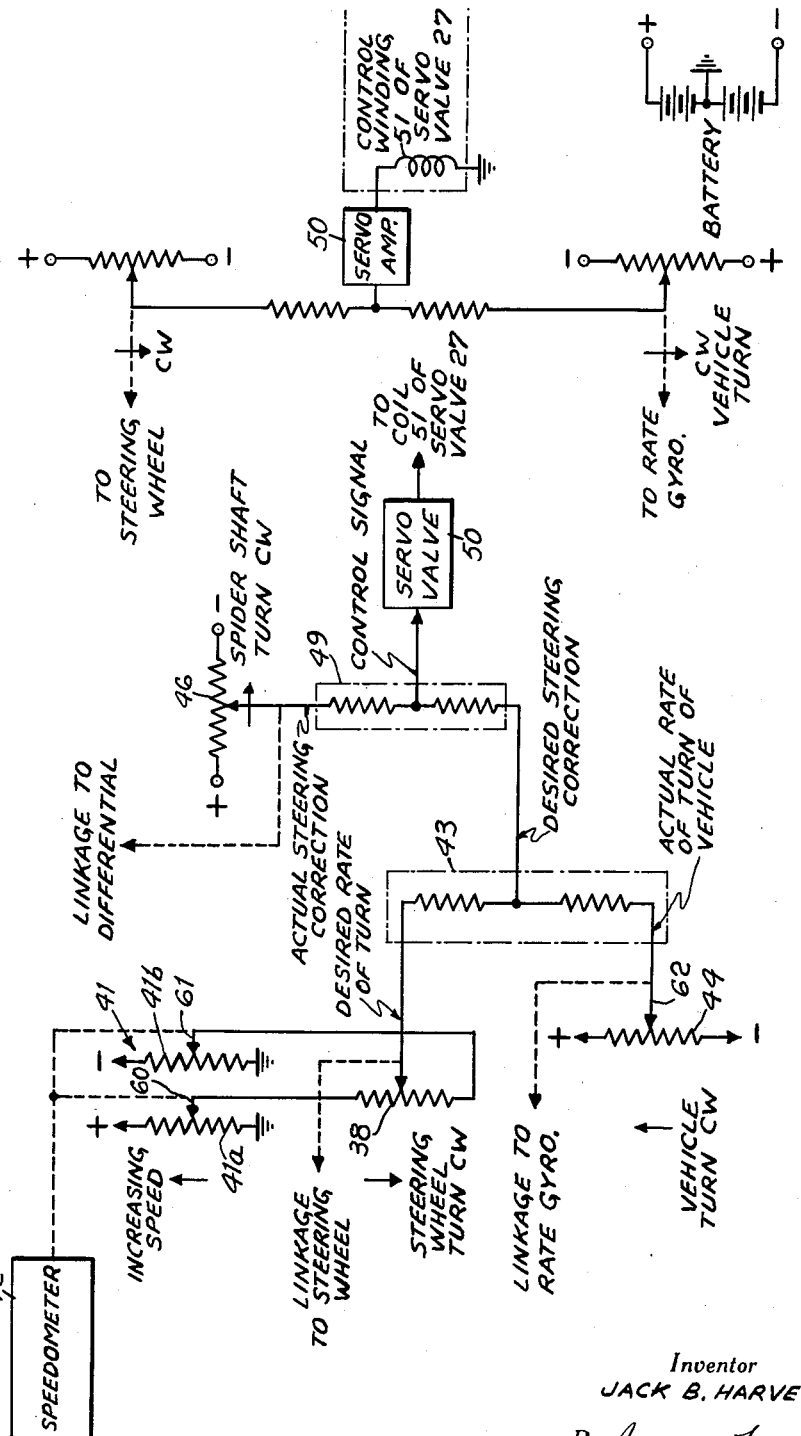
Inventor
JACK B. HARVEY
By Isidore Togut
Attorney United States Patent Office 2,987,135
Patented June 6, 1961

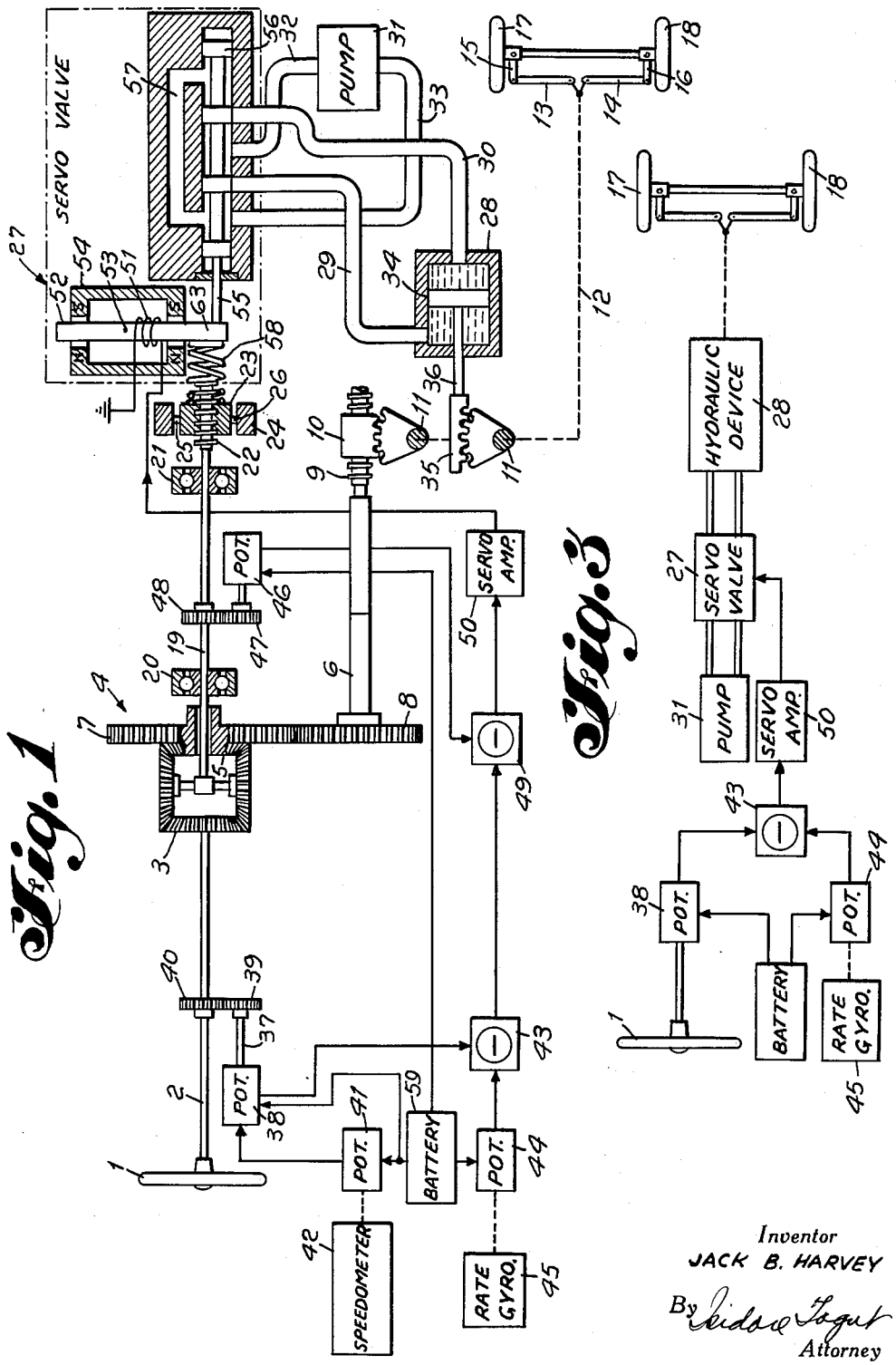

2,987,135
VEHICLE STEERING SYSTEM WITH AUTO-
MATIC CORRECTING MEANS
Jack B. Harvey, Clifton, N.J., assignor to International
Telephone and Telegraph Corporation, Nutley, N.J., a
corporation of Maryland
Filed Dec. 23, 1958, Ser. No. 782,416
6 Claims. (Cl. 180—79.2)

This invention relates to a steering system for vehicles and more particularly a steering system having automatic means for counteracting undesired turns of the vehicle.

An object of this invention is to provide a system in a vehicle for detecting skids and undesired turns of the vehicle, such as may be caused by icy and slippery roads and high winds.

A further object is to provide correction means responsive to the detection means to a vehicle's power steering apparatus to rapidly and automatically counteract the skids and undesired turns.

A feature of this invention is a steering system for a vehicle comprising manually controllable steering means for steering the vehicle. There are provided means for detecting the angular motion of the vehicle and for comparing the angular motion of the vehicle with the angular motion set according to the manual position of the manually controllable steering means and means for adjusting the steering means in accordance with the comparison.

Another feature is that the detecting means comprises a rate gyroscope and the means for adjusting the steering means comprises hydraulic means and a servo system responsive to the output of the comparison to control the hydraulic means.

Still another feature is that one embodiment of this invention provides for maintaining a constant radius of turn and independent of the speed of the vehicle. In this embodiment, a voltage is derived proportional to the speed of the vehicle and is combined with a voltage proportional to the angular motion of the steering column to derive a voltage indicative of the desired rate of turn of the vehicle. This desired rate of turn voltage is added to the actual rate of turn voltage derived from the rate gyroscope to provide a voltage which is the desired steering correction for the vehicle. A differential gear train couples the steering column to the steering mechanism of the vehicle. A servo system controls hydraulic means which provides power steering for the vehicle. A voltage is derived from the spider shaft of the differential gear train which is indicative of the actual steering correction given to the vehicle and this actual steering correction voltage when combined with the desired steering correction voltage in a summing circuit provides a control signal indicative of the required steering correction for the vehicle. This control signal is coupled to the servo system which varies the operation of the hydraulic means in accordance with the variations of the control signal in the direction to provide the required steering correction to the vehicle.

Another feature is that in a second embodiment of this invention the radius of turn is proportional to the speed of the vehicle. This is a constant rate of turn embodiment. In this embodiment, a voltage is derived proportional to the angular motion of the steering column. This is combined in a summing circuit with the voltage derived from the rate gyroscope which is indicative of the actual rate of turn of the vehicle. The output of the summing circuit is the error voltage which actuates the servo system to vary the operation of the power steering hydraulic means in the proper direction to provide the required steering correction to the vehicle. This embodiment provides a more complete electronic control of the steering system of the vehicle since there is no mechanical coupling between the steering wheel and the steering mechanism of the vehicle.

The above-mentioned and other features and objects of this invention will become more apparent by reference to the following description taken in conjunction with the accompanying drawings, in which:

FIG. 1 is a diagram showing the mechanical and electrical coupling of the components of the steering system of this invention;

FIG. 2 is an electrical schematic diagram of the embodiment of FIG. 1;

FIG. 3 is a mechanical and electrical block diagram of a second embodiment of this invention; and FIG. 4 is an electrical schematic diagram for the embodiment of FIG. 3.

Referring now to FIGS. 1 and 2, there is shown the steering wheel 1 of a vehicle coupled to a steering column 2. An input bevel gear 3 of a differential gear train 4 is coupled to the steering column 2. Another input bevel gear 5 is coupled to a worm gear shaft 6 by means of spur gears 7 and 8. The worm gear 9 operates through the ball nut 10 in the usual manner to rotate the pitman shaft 11 which is coupled to the drag link 12. The drag link 12 moves the tie rods 13 and 14 and the knuckle arms 15 and 16 to turn the wheels 17 and 18 in the desired direction. The spider shaft 19 of the differential gear train 4 is supported by bearings 20 and 21 and is provided with a thread 22 at the opposite end. A nut 23 engages with the threads 22 and is movable laterally within the fixed guide 24 which has longitudinal parallel slots in which pins 25 and 26 are disposed, thus preventing rotation of the nut 23 and confining its movement to a lateral direction. A servo valve 27, such as, for instance, the Lear-Romec series 5214 "Electro-Hydraulic Servo Valve" manufactured by the Lear-Romec Division of Lear, Abbe Road, Elyria, Ohio, is coupled to a hydraulic device 28 by means of conduits 29 and 30. A pump 31 provides high pressure hydraulic fluid to the servo valve 27 and from thence to the hydraulic device 28 by means of conduits 32 and 33. A piston 34 disposed within the hydraulic device 28 is coupled to the pitman shaft 11 by means of a rack 35 at the end of the piston rod 36. The movable arm 37 of a potentiometer 38 is coupled to the steering column 2 by means of spur gears 39 and 40. A dual concentric potentiometer 41 is mechanically coupled to the speedometer 42 of the vehicle. The outputs of the potentiometers 38 and 41 are fed into a summing circuit 43 to which is also fed the output of a potentiometer 44 which is mechanically coupled to a rate gyroscope 45. A potentiometer 46 is coupled to the spider shaft 19 by means of the spur gear train 47 and 48. The outputs of the potentiometer 46 and the summing circuit 43 are fed into a summing circuit 49, and the output of the summing circuit 49 is coupled to a servo amplifier 50. The output of the servo amplifier 50 is coupled to a torque motor coil 51 of the servo valve 27 which is wound about a magnetically permeable bar 52 and is pivotable about a center pin 53. The bar 52 is positioned between the poles of a permanent magnet 54 and upon energization of the coil 51 by means of the error voltage output of the servo amplifier 50, it will rotate towards the north or south pole of the magnet 54 depending upon the current flow through the coil 51. This will, in turn, move a rod 55 of a spool valve 56 disposed within the hydraulic chamber 57 of the servo valve 27. Depending upon the direction of movement of the spool valve, the high pressure hydraulic fluid from the pump 31 will enter the hydraulic chamber 57 through the conduit 32 and thence through either conduit 29 or 30 to transmit the fluid to the hydraulic device 28 and thereby move the piston 34 in the required direction for the appropriate rotation of the pitman shaft 11. A coil spring 58 is connected to the laterally movable nut 23 and the bar 52 and exerts spring pressure upon the bar 52 which varies with the lateral movement of the nut 23. A source of D.C. voltage, a battery 59, is coupled to the potentiometers 38, 41, 44 and 46.

In the operation of the system of FIGS. 1 and 2, the speedometer 42 is coupled to the movable arms 60 and 61 of the dual concentric potentiometers 41. The polarity of the supply voltage is made positive for one potentiometer 41a and negative at the corresponding terminal for the potentiometer 41b. The output from the wiper arms 60 and 61 are fed to the opposite terminals of the potentiometer 38 which is coupled to the steering wheel. The speedometer potentiometers 41a and 41b are of the linear taper type and have a balanced voltage input. The output of the potentiometers 41a and 41b is a voltage proportional to the speed of the vehicle. The steering wheel potentiometer 38 produces a voltage which is proportional to $\theta$, the angle through which the steering wheel is turned. When the voltage outputs of the potentiometers 41a and 41b are combined with the potentiometer 38 voltage, there is secured a voltage output which is proportional to the desired rate of turn. The rate gyroscope 45 senses the actual turning movement of the vehicle and the output of the potentiometer 44, which is mechanically linked with the rate gyroscope 45 is a voltage proportional to the actual rate of turn of the vehicle according to the equation $$\omega = \frac{v}{R}$$

where $\omega$ is the angular velocity of the vehicle, $v$ is the speed of the vehicle and R is the radius of the turn. When the voltage outputs, equivalent to the desired rate of turn and the actual rate of turn, are added together in the summing circuit 43, the output will be zero when the actual rate of turn voltage equals the desired rate of turn voltage. However, if the two voltages are unequal, there will be a voltage output from the summing circuit 43 which is equivalent to the desired steering correction. The output of the potentiometer 46 is proportional to the difference between the rotation of the two inputs to the differential gear train 4. If the rotation of the steering column 2 is equal to the rotation of the worm shaft 6, there will be no rotation of the spider shaft 19 and consequently, no output from the potentiometer 46. Any difference, however, between the angular displacements of the steering column 2 and the worm shaft 6 will result in a differential rotation of the spider shaft and a voltage output from the potentiometer 46 which is proportional to the difference between the angular displacements of the steering column 2 and the worm shaft 6. This differential voltage output of potentiometer 46 is the actual steering correction that has been provided for the vehicle. The actual steering correction voltage and the desired steering correction voltage are then added together in the summing circuit 49 to secure an error voltage control signal which when amplified in the servo amplifier 50 and fed to the servo valve 27 will energize the servo valve and control the flow of the high pressure hydraulic fluid to the correct side of the piston 34 for the proper turning movement of the pitman arm 11 and the steering wheels 17 and 18.

Assume the case where a vehicle is traveling in a straight direction on the road, the rear wheels encounter an icy or slippery portion thereon and skid to the right causing a turning motion of the front of the car towards the left. It is necessary then to counteract the skid and apply a corrective voltage to the servo system which will turn the steering wheels toward the right. Since the steering wheel was not turned, the balanced voltage input to the steering wheel potentiometer 38 will produce a zero output voltage therefrom. The rate gyro 45 senses the turning movement of the car towards the left and thereby moves the arm 62 of the potentiometer 44 towards the negative potential thereby producing a negative output from the potentiometer 44. The output of the summing circuit 43 is also negative. The output of the potentiometer 46 is zero since the front wheels have not turned and therefore the worm shaft has not rotated, the steering column has not been rotated so that there is no differential rotation of the spider shaft 19 and no output from the potentiometer 46. The output error voltage of the summing circuit 49 is therefore a negative voltage. This negative voltage when applied to the coil 51 produces a magnetic field in the bar 52 with the polarity at the actuating end, north. The bar 52 rotates towards the right forcing the spool valve 56 to the right and the high pressure fluid flows through the conduit 30 and moves the piston towards the left turning the pitman shaft counterclockwise which in turn through the drag link 12, the tie rods 13 and 14 and the knuckle arms 15 and 16 will turn the wheels to the right for clockwise rotation, or right turn, of the vehicle. Assume the case of a vehicle parked at a curb, not moving, and the driver desires to move out from the curb. He turns the steering wheel to the left. The wheels, of course, will not move since the curb effectively prevents their turning to the right. However, the steering wheel will rotate and there will be a differential output from the potentiometer 46. The output of the speedometer potentiometers will be zero. The output of the steering wheel potentiometer 38 will be zero, since the potentiometer arms 60 and 61 will be at ground potential. Since there is no turning movement of the vehicle, the output of the rate gyroscope and the potentiometer 44 will be zero. The output of the spider shaft potentiometer 46 will be proportional to the difference in rotation of the steering column 2 and the worm shaft 6. Since the worm shaft 6 is fixed and not rotating, as the wheels are not turning, then the spider shaft will rotate in the same direction as the direction of rotation of the steering column 2 or counterclockwise in respect to the steering column rotation. Therefore, there will be a positive voltage output from the potentiometer 46. The output of the summing circuit 49 will therefore be a positive voltage which when applied to the coils 51 will produce a south magnetic pole at the bar end 63 and cause it to rotate to the left thereby moving the spool valve 56 towards the left, introducing high pressure hydraulic fluid into the conduit 29 to move the piston to the right for turning the wheels of the vehicle to the left or counterclockwise.

The embodiment of FIGS. 1 and 2 provides a constant radius circuit with the speed of the vehicle varying. According to the equations $$\omega = \frac{v}{R}$$

or $v = R\omega$. For a constant radius with the steering wheel angle $\theta$, $$R = \frac{K}{\theta}$$

where K equals a constant and $$\theta = \frac{K}{R}$$

$$\theta \cdot v = \frac{K}{R} \cdot R\omega$$

$$= K\omega$$

By reducing the range of movement of the speed potentiometers, we can have any combination of constant rate and constant radius.

The spring 58 resists movement of the spider shaft 19 of the differential gear train 4. This provides a "feel" of the road and in the event of failure of the electrical control system, some power assistance can still be obtained because of the force exerted on the bar 52 of the servo valve. In the event of failure of the servo system, the steering wheel through the differential gear train will exert some control of the steering.

With reference to FIGS. 3 and 4, there is shown a constant rate system which is almost completely electronic in the steering control and the driver has no mechanical control of the power steering through the steering column 2. In this embodiment, the rotation of the potentiometer 38 is controlled by the rotation of the steering column. The output of the rate gyroscope potentiometer 44 and the steering potentiometer 38 is fed into the summing amplifier 43 to derive an error voltage output thereof for control of the power steering system of the vehicle. The error voltage is amplified in the servo amplifier 50 and fed as described above to the servo valve 27 which, responsive to the error voltage variations, will control the operation of the hydraulic device in the same manner as described above for the appropriate control of the steering system.

While I have described above the principles of my invention in connection with specific apparatus, it is to be clearly understood that this description is made only by way of example and not as a limitation to the scope of my invention as set forth in the objects thereof and in the accompanying claims.

I claim:

1. A steering system for a vehicle comprising manually controllable steering means including a steering wheel and steering column coupled thereto for steering said vehicle, means for detecting the actual rate of angular motion of said vehicle, means coupled to said detecting means to derive a voltage therefrom indicative of the actual rate of angular motion, means connecting said steering column to the steering mechanism of said vehicle controlling the steering movement of the steering wheels of said vehicle, hydraulic means coupled to said steering mechanism, a servo valve controlling the operation of said hydraulic means, means coupled to said steering wheel column to detect the angular motion thereof and derive a voltage proportional to said angular motion of said column, means coupled to the speedometer of said vehicle to derive a voltage proportional to the speed of said vehicle, means coupling said voltage proportional to said speed to said voltage proportional to the angular motion of said column to derive a voltage indicative of the desired rate of angular motion of said vehicle, a first summing circuit, means coupling the actual rate of angular motion voltage and the desired rate of angular motion voltage to said first summing circuit to derive therefrom a voltage output indicative of the desired steering correction for said vehicle, means associated with said connecting means to produce an output proportional to the difference between the angular motion of said steering column and the angular motion of said steering mechanism which is indicative of the actual steering correction provided for said vehicle, a second summing circuit, means coupling the desired steering correction voltage and the actual steering correction voltage to said second summing circuit to derive an error voltage output therefrom indicative of the required steering correction to be given to said steering means, a servo amplifier coupling said error voltage to said servo valve to actuate said servo valve to vary the operation of said hydraulic means in the desired direction to provide the required steering correction to said vehicle.

2. A steering system for a vehicle comprising manually controllable steering means including a steering wheel and steering column coupled thereto for steering said vehicle, a differential gear train, means coupling said steering column to a first input of said differential gear train, means coupling the second input of said differential to the steering mechanism of said vehicle controlling the steering movement of the steering wheels of said vehicle, hydraulic means coupled to said steering mechanism, a servo valve controlling the operation of said hydraulic means, means coupled to said steering column to detect the angular motion thereof and derive a voltage proportional to said angular motion of said column, means coupled to the speedometer of said vehicle to derive a voltage proportional to the speed of said vehicle, means coupling said voltage proportional to said speed to said voltage proportional to the angular motion of said column to derive an output voltage indicative of the desired rate of angular motion of said vehicle, a rate gyroscope for detecting the actual rate of angular motion of said vehicle, means coupled to said rate gyroscope to derive a voltage therefrom proportional to said actual rate of angular motion, a first summing circuit, means coupling the actual rate of angular motion voltage and the desired rate of angular motion voltage to said first summing circuit to derive therefrom a voltage output indicative of the desired steering corection for said vehicle, means coupled to the spider shaft of said differential gear train to derive an output therefrom proportional to the difference between the angular motion of said steering column and the angular motion of the worm shaft of said steering mechanism which is indicative of the actual steering correction provided for said vehicle, a second summing circuit, means coupling the desired steering correction voltage and the actual steering correction voltage to said second summing circuit to derive an error voltage output therefrom indicative of the required steering correction to be given to said steering means, and a servo amplifier coupling said error voltage to said servo valve to actuate said servo valve to vary the operation of said hydraulic means in the direction to provide the required steering correction to said vehicle.

3. A steering system for a vehicle comprising manually controllable steering means including a steering wheel and steering column coupled thereto for steering said vehicle, a rate gyroscope for detecting the actual rate of angular motion of said vehicle, means coupled to said rate gyroscope to derive a voltage therefrom indicative of the actual rate of angular movement, a differential gear train, means coupling said steering column to a first input of said differential gear train, means coupling the second input of said differential to the steering mechanism of said vehicle controlling the steering movement of the steering wheels of said vehicle, hydraulic means coupled to said steering mechanism, a servo valve controlling the operation of said hydraulic means, means coupled to said steering wheel column to detect the angular motion thereof and derive a voltage proportional to said angular motion of said column, means coupled to the speedometer of said vehicle to derive a voltage proportional to the speed of said vehicle, means coupling said voltage proportional to said speed to said voltage proportional to the angular motion of said column to derive an output voltage indicative of the desired rate of angular motion of said vehicle, a first summing circuit, means coupling the actual rate of angular movement voltage and the desired rate of angular movement voltage to said first summing circuit to derive therefrom a voltage output indicative of the desired steering correction for said vehicle, means coupled to the spider shaft of said differential gear train to derive an output therefrom proportional to the difference between the angular motion of said steering column and the angular motion of the worm shaft of said steering mechanism which is indicative of the actual steering correction provided for said vehicle, a second summing circuit means coupling the desired steering correction voltage and the actual steering correction voltage to said second summing circuit to derive an error voltage output thereof indicative of the required steering correction to be given to said steering means, a servo amplifier coupling said error voltage to said servo valve to actuate said servo valve to vary the output of said servo valve and drive said hydraulic means in the desired direction to provide the required steering correction to said steering wheels and resilient means coupling said spider shaft to said actuating means.

4. A steering system for a vehicle comprising manually controllable steering means including a steering wheel and a steering column coupled thereto for steering said vehicle, a rate gyroscope, means coupled to said gyroscope to derive an output voltage therefrom indicative of the actual rate of angular motion of said vehicle, a differential gear, means coupling said steering column and the steering mechanism of said vehicle to the inputs of said differential gear whereby any difference between the angular displacements of said column and said steering mechanism will produce a differential rotation of the output shaft of said differential gear proportional to the actual steering correction for said vehicle, hydraulic means coupled to said steering mechanism, a servo system, and means responsive to said actual rate of angular motion, the angular motion set according to the manual position of said manually controllable steering means and said differential rotation to control said servo system to operate said hydraulic means for steering said vehicle.

5. A steering system for a vehicle according to claim 4 further including means coupled to said steering wheel column to detect the angular motion thereof and derive a voltage proportional to said angular motion of said column, means coupled to the speedometer of said vehicle to derive a voltage proportional to the speed of said vehicle, and means coupling said voltage proportional to the speed of said vehicle to the voltage proportional to said angular motion of said column to derive an output voltage indicative of the desired rate of angular motion of said vehicle and means responsive to said voltage indicative of the desired rate of angular motion, to said voltage indicative of the actual rate of turn of said vehicle and to said differential rotation to produce a control signal to control said servo system.

6. A steering system for a vehicle according to claim 5 further comprising a first summing circuit, means coupling said actual rate of angular motion voltage and said desired rate of angular motion voltage to said first summing circuit to derive therefrom a voltage output indicative of the desired steering correction for said vehicle and means responsive to said voltage indicative of the actual steering correction for said vehicle and to said differential rotation to produce said control signal to control said servo system.

References Cited in the file of this patent
UNITED STATES PATENTS

| | | |
|---|---|---|
| 2,667,232 | Woolley | Jan. 26, 1954 |
| 2,851,795 | Sherman | Sept. 16, 1958 |
| 2,865,462 | Milliken et al. | Dec. 23, 1958 |